United States Patent
Shibata et al.

(10) Patent No.: US 12,114,201 B2
(45) Date of Patent: Oct. 8, 2024

(54) SIGNAL TRANSFER DEVICE, SIGNAL TRANSFER METHOD, SIGNAL TRANSFER CONTROL DEVICE, SIGNAL TRANSFER CONTROL METHOD AND SIGNAL TRANSFER PROGRAM

(71) Applicant: NIPPON TELEGRAPH AND TELEPHONE CORPORATION, Tokyo (JP)

(72) Inventors: Naotaka Shibata, Musashino (JP); Hiroyuki Uzawa, Musashino (JP); Yoichi Fukada, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 470 days.

(21) Appl. No.: 17/429,841

(22) PCT Filed: Feb. 4, 2020

(86) PCT No.: PCT/JP2020/004053
§ 371 (c)(1),
(2) Date: Aug. 10, 2021

(87) PCT Pub. No.: WO2020/166427
PCT Pub. Date: Aug. 20, 2020

(65) Prior Publication Data
US 2022/0217572 A1     Jul. 7, 2022

(30) Foreign Application Priority Data
Feb. 14, 2019   (JP) ................................. 2019-024714

(51) Int. Cl.
*H04W 28/02*     (2009.01)
*H04L 12/46*     (2006.01)
(Continued)

(52) U.S. Cl.
CPC ..... *H04W 28/0268* (2013.01); *H04L 12/4641* (2013.01); *H04W 28/0278* (2013.01); *H04W 28/06* (2013.01); *H04W 72/56* (2023.01)

(58) Field of Classification Search
CPC ......... H04W 28/0268; H04W 28/0278; H04W 28/06; H04W 72/56; H04L 12/4641; H04L 47/6235; H04L 47/6295
See application file for complete search history.

(56) References Cited

U.S. PATENT DOCUMENTS

2005/0232155 A1\* 10/2005 Morikawa ........... H04L 47/6215
370/235
2009/0154436 A1\* 6/2009 Choi ................... H04W 72/569
370/338
(Continued)

FOREIGN PATENT DOCUMENTS

| EP | 1578072 A1 | 9/2005 |
|---|---|---|
| JP | 2018129661 A | 8/2018 |
| JP | 2019004329 A | 1/2019 |

OTHER PUBLICATIONS

"Time-Sensitive Networking for Fronthaul", IEEE Std 802.1cm-2018.

(Continued)

*Primary Examiner* — Rina C Pancholi

(57) ABSTRACT

There are included a control unit configured to, when detecting that no high priority traffic frame arrives for a frame interval threshold or longer in the period that allows high priority traffic frames to be transmitted, release the period that allows high priority traffic frames to be transmitted and allocate the released period to the period that allows low priority traffic frames to be transmitted, a frame arrival time information acquisition unit configured to obtain information of frame arrival times of high priority traffic frames, a frame interval calculation unit configured to cal-
(Continued)

culate, in accordance with the information of frame arrival times obtained by the frame arrival time information acquisition unit, frame intervals between frames of the high priority traffic frames input in chronological order, a frame interval threshold calculation unit configured to calculate a new frame interval threshold in accordance with the frame intervals, and a frame interval threshold configuration unit configured to change the frame interval threshold to the new frame interval threshold.

4 Claims, 11 Drawing Sheets

(51) Int. Cl.
*H04W 28/06* (2009.01)
*H04W 72/56* (2023.01)

(56) References Cited

U.S. PATENT DOCUMENTS

2018/0365524 A1  12/2018  Kajiwara et al.
2019/0289616 A1* 9/2019  Hampel ............... H04B 7/0413

OTHER PUBLICATIONS

International Search Report issued in PCT/JP2020/004053, mailed on May 12, 2020.

* cited by examiner

SIGNAL TRANSFER DEVICE, SIGNAL TRANSFER METHOD, SIGNAL TRANSFER CONTROL DEVICE, SIGNAL TRANSFER CONTROL METHOD AND SIGNAL TRANSFER PROGRAM

CROSS-REFERENCE TO RELATED APPLICATIONS

This application is a 371 U.S. National Phase of International Application No. PCT/JP2020/004053 filed on Feb. 4, 2020 which claims priority to Japanese Application No. 2019-024714 filed on Feb. 14, 2019. The entire disclosures of the above applications are incorporated herein by reference.

TECHNICAL FIELD

The present invention relates to a signal transfer technology using Time Aware Shaper (TAS).

BACKGROUND ART

In recent years, in usual cellular systems, a radio control device and a radio device are separately provided as a base station configuration. In this configuration, the radio control device and the radio device are connected by an optical path involving an optical device and an optical fiber; the optical path involving an optical device and an optical fiber is referred to as mobile fronthaul (MFH).

For MFH, point-to-point connections have been used, but networking is being studied for the purpose of reducing costs for MFH. As examples of networking, wavelength division multiplexed (WDM) networking, time division multiplexing passive optical network (TDM-PON), a configuration in which layer 2 switches (L2SWs) are coupled in multiple stages have been developed (refer to, for example, Non-Patent Literature 1). In particular, with the network system in which layer 2 switches serving as signal transfer devices are connected in multiple stages (hereinafter referred to as "L2NW"), a plurality of paths can be constructed between a radio device and a radio control device in a pair, and thus, it is considered that the L2NW can achieve higher redundancy as compared to other kinds of network systems.

Incidentally, low delays are required for MFH, and thus, to handle traffic with strict delay requirements, the standardization of time sensitive network (TSN) has proceeded and the application of TSN is being studied (refer to, for example, Patent Literature 1 and 2). TAS studied for TSN is effective especially when high priority traffic has the periodicity. With the TAS technology, traffic streams are scheduled in accordance with priority so as to enable or disable communication. Specifically, while high priority traffic is arriving at SW, only high priority traffic is forwarded but low priority traffic is not forwarded; while high priority traffic is not arriving, low priority traffic is forwarded; these operations are periodically repeated. As such, high priority traffics can be forwarded without waiting for traffics of other priorities, and as a result, the TAS technique is suitable to achieve low delays.

FIG. 7 illustrates an example of a configuration of a usual signal transfer device using TAS. In FIG. 7, the signal transfer device includes a frame differentiation unit 901, a high priority buffer 902, a low priority buffer 903, an output unit 904, and a scheduler unit 905. The frame differentiation unit 901 distinguishes input traffic between low priority frames and high priority frames. The high priority buffer 902 stores a distinguished high priority frame. The low priority buffer 903 stores a distinguished low priority frame. The output unit 904 outputs an output frame from the high priority buffer 902 or the low priority buffer 903 to a forwarding destination. The scheduler unit 905 provides, in accordance with present time information, an output stop instruction for the high priority buffer 902 and an output instruction for the low priority buffer 903 during a low priority signal transmission period; in contrast, the scheduler unit 905 provides, in accordance with present time information, an output instruction for the high priority buffer 902 and an output stop instruction for the low priority buffer 903 during a high priority signal transmission period.

FIG. 8 illustrates an example in which high priority radio devices (A1, A2) and high priority radio control devices (S1, S2) are accommodated by using an L2NW. In the example in FIG. 8, an upstream signal from the high priority radio device A1 to the high priority radio control device S1 is forwarded along a path from an L2SW(1) to an L2SW(2) to an L2SW(3) to an L2SW(4); an upstream signal from the high priority radio device A2 to the high priority radio control device S2 is forwarded along a path from the L2SW(2) to the L2SW(3).

FIG. 9 illustrates an example of traffic streams in the L2NW. FIG. 9 corresponds to the L2NW employing the TAS technique illustrated in FIG. 8. Every L2SW repeats a period that allows high priority traffic to be transmitted (high priority signal transmission period) and a period that allows low priority traffic can be transmitted (low priority signal transmission period). For example, two traffic streams of frames 1 from the radio device A1 and frames 2 from the radio device A2 both flow into the L2SW(2) and the both kinds of frames are alternately output. Here, when only either frames from the radio device A1 or the radio device A2 are brought into focus with respect to the output of the L2SW(2), the interval of the frame 1 (or the interval of the frame 2) is extended as compared to the interval of the output of the radio device A1 (or the output of the radio device A2); in other words, the frame interval is extended.

As described in Patent Literature 2, it is assumed that burst traffic transmission occur at MFH. In addition, the amount of traffic at MFH keeps changing in accordance with communication environments surrounding terminals. Thus, as indicated as the output of the L2SW(1), the output of the L2SW(2), and the output of the L2SW(4) illustrated in FIG. 9, when traffic is relatively less, no traffic flows in the latter period of the high priority signal transmission period (for example, periods TS1, TS2, and TS3 in FIG. 9). With this regard, to effectively use the high priority signal transmission period when traffic is less, technologies have been developed in which, when the end of high priority traffic is detected, the high priority signal transmission period is released to transmit low priority traffic (refer to, for example, Patent Literature 2).

FIG. 10 illustrates an example of traffic streams when the high priority signal transmission period is released. Similarly to FIG. 9, FIG. 10 corresponds to the L2NW illustrated in FIG. 8. It can be seen that, in FIG. 10, after the signal transfer devices L2SW(1), L2SW(2) and L2SW(4) each detect the end of traffic in the high priority signal transmission period (for example, TD1, TD2 and TD3 in FIG. 10), the signal transfer devices L2SW(1), L2SW(2) and L2SW(4) release the high priority signal transmission period and extend the low priority signal transmission period to allocate the period to transmit low priority signals.

To detect the end of high priority traffic as described above, for example, the two following methods can be considered. The first method is that the high priority radio device or the high priority radio control device outputs a detection signal indicating the end of traffic. However, to implement this method, the high priority radio device or the high priority radio control device needs to have a function of outputting a detection signal. Furthermore, the signal transfer device also needs to have a function of correctly recognizing the detection signal output by the radio device or the radio control device, and thus, laborious work is necessary to match specifications among various types of signal transfer devices and implement the signal transfer devices in accordance with the specifications. The second method is that the signal transfer device autonomously detects the end of high priority traffic. On the assumption that high priority traffic flows in a burst manner, it can be considered that, when no frame is received for a predetermined time or longer after the final frame was received, high priority traffic has finished. Here, the time used to assume that high priority traffic has finished after the final frame was received is referred to as a frame interval threshold.

FIG. 11 illustrates an example of a configuration of a known signal transfer device for autonomously detecting the end of high priority traffic. In FIG. 11, the blocks assigned the same reference numerals as those of FIG. 7 operate in the manner similar to the blocks in FIG. 7. In FIG. 11, the configuration additionally includes a frame arrival time information acquisition unit 906 for obtaining the arrival time information of a frame that have most recently arrived at the high priority buffer 902. In FIG. 11, when the time of the frame interval threshold or longer elapses after the arrival time of a frame that have most recently arrived in the high priority signal transmission period, information of the arrival time being obtained by the frame arrival time information acquisition unit 906, the scheduler unit 905 provides an output stop instruction for the high priority buffer 902 and an output instruction for the low priority buffer 903. This reduces the idle time in the high priority signal transmission period so as to effectively use the communication band.

CITATION LIST

Non-Patent Literature

Non-Patent Literature 1: "Time-Sensitive Networking for Fronthaul", IEEE Std 802.1CM-2018.

Patent Literature

Patent Literature 1: Japanese Patent Laid-Open No. 2018-129661
Patent Literature 2: Japanese Patent Laid-Open No. 2019-004329

SUMMARY OF THE INVENTION

Technical Problem

To reduce the idle time in the high priority signal transmission period and effectively use the communication band, it is necessary to make the frame interval threshold as small as possible. However, for example, in FIG. 9, the output of the L2SW(1) is only the frames 1 from the radio device A1; in contrast, the output of the L2SW(4) is both the frames 1 from the radio device A1 and the frames 2 from the radio device A2, and thus, the intervals between the frames are extended; consequently, the frame interval may vary among the signal transfer devices. In this case, if the frame interval thresholds of all the signal transfer devices are set to the frame interval of the L2SW(1), since the frame interval of the L2SW(4) is relatively long, the high priority signal transmission period in the L2SW(4) may be released although the high priority traffic has not ended. Hence, it is necessary to set an optimum frame interval threshold for each signal transfer device.

Moreover, when the radio device A2 does not exist and different frame streams do not flow into the signal transfer device, the frame interval of traffic output from a particular radio device is determined in accordance with installation conditions of a corresponding radio device, and thus, it is difficult to preset the frame interval threshold by using the signal transfer device.

Further, after the frame interval threshold is set, if flows increase in number because radio devices are added or if the number of frame streams flowing into the signal transfer devices change because the L2SW connection configuration changes, the frame interval threshold needs to be set again, which makes the user operation complicated.

An object of the present invention is to provide a signal transfer device, a signal transfer method, a signal transfer control device, a signal transfer control method, and a signal transfer program for determining optimum frame interval thresholds for individual signal transfer devices autonomously without any user operation by setting optimum frame interval thresholds in accordance with frame arrival intervals calculated for corresponding signal transfer devices, when flows change due to addition of radio devices or communication conditions.

Means for Solving the Problem

A signal transfer device of a first invention for forwarding high priority traffic frames and low priority traffic frames includes a control unit configured to periodically switch between a period that allows high priority traffic frames to be transmitted and a period that allows low priority traffic frames to be transmitted and, when the control unit detects that no high priority traffic frame arrives for a preset frame interval threshold or longer in the period that allows high priority traffic frames to be transmitted, release the period that allows high priority traffic frames to be transmitted and allocate the released period to the period that allows low priority traffic frames to be transmitted, a frame arrival time information acquisition unit configured to obtain information of frame arrival times of the high priority traffic frames, a frame interval calculation unit configured to calculate, in accordance with the information of frame arrival times obtained by the frame arrival time information acquisition unit, frame intervals between frames of the high priority traffic frames input in chronological order, a frame interval threshold calculation unit configured to calculate a new frame interval threshold in accordance with the frame intervals, and a frame interval threshold configuration unit configured to change the frame interval threshold to the new frame interval threshold.

As for a second invention according to the signal transfer device of the first invention, the frame interval threshold calculation unit may be configured to calculate the new frame interval threshold in accordance with the frame intervals excluding a frame interval including the period that allows low priority traffic to be transmitted.

A signal transfer method of a third invention for forwarding high priority traffic frames and low priority traffic frames includes control processing of periodically switching between a period that allows high priority traffic frames to be transmitted and a period that allows low priority traffic frames to be transmitted and, when the control unit detects that no high priority traffic frame arrives for a preset frame interval threshold or longer in the period that allows high priority traffic frames to be transmitted, releasing the period that allows high priority traffic frames to be transmitted and allocating the released period to the period that allows low priority traffic frames to be transmitted, frame arrival time information acquisition processing of obtaining information of frame arrival times of the high priority traffic frames, frame interval calculation processing of calculating, in accordance with the information of frame arrival times obtained by the frame arrival time information acquisition processing, frame intervals between frames of the high priority traffic frames input in chronological order, frame interval threshold calculation processing of calculating a new frame interval threshold in accordance with the frame intervals, and frame interval threshold configuration processing of changing the frame interval threshold to the new frame interval threshold.

As for a fourth invention according to the signal transfer method of the third invention, the frame interval threshold calculation processing may include calculating the new frame interval threshold in accordance with the frame intervals excluding a frame interval including the period that allows low priority traffic to be transmitted.

A signal transfer control device of a fifth invention controls at least one signal transfer device configured to, when the signal transfer device periodically switches between a period that allows high priority traffic frames to be transmitted and a period that allows low priority traffic frames to be transmitted so as to forward high priority traffic frames and low priority traffic frames, in a case in which the signal transfer device detects that no high priority traffic frame arrives for a preset frame interval threshold or longer in the period that allows high priority traffic frames to be transmitted, release the period that allows high priority traffic frames to be transmitted and allocate the released period to the period that allows low priority traffic frames to be transmitted. The signal transfer control device includes a frame interval calculation unit configured to, when the at least one signal transfer device includes a plurality of signal transfer devices, obtain from the plurality of signal transfer devices information of arrival times of high priority traffic frames and calculate, for the respective signal transfer devices, frame intervals between frames of the high priority traffic frames input in chronological order, a frame interval threshold calculation unit configured to calculate, for the respective signal transfer devices, new frame interval thresholds in accordance with the frame intervals, and a frame interval threshold configuration unit configured to send notifications to the plurality of signal transfer devices to change the frame interval threshold to a corresponding one of the new frame interval thresholds.

A signal transfer control method of a sixth invention controls at least one signal transfer device configured to, when the signal transfer device periodically switches between a period that allows high priority traffic frames to be transmitted and a period that allows low priority traffic frames to be transmitted so as to forward high priority traffic frames and low priority traffic frames, in a case in which the signal transfer device detects that no high priority traffic frame arrives for a preset frame interval threshold or longer in the period that allows high priority traffic frames to be transmitted, release the period that allows high priority traffic frames to be transmitted and allocate the released period to the period that allows low priority traffic frames to be transmitted. The signal transfer control method includes frame interval calculation processing of, when the at least one signal transfer device includes a plurality of signal transfer devices, obtaining from the plurality of signal transfer devices information of arrival times of high priority traffic frames and calculating, for the respective signal transfer devices, frame intervals between frames of the high priority traffic frames input in chronological order, frame interval threshold calculation processing of calculating, for the respective signal transfer devices, new frame interval thresholds in accordance with the frame intervals, and frame interval threshold configuration processing of sending notifications to the plurality of signal transfer devices to change the frame interval threshold to a corresponding one of the new frame interval thresholds.

A seventh invention is a signal transfer program for causing a computer to execute a process of the signal transfer method according to the third or fourth invention or the signal transfer control method according to the sixth invention.

Effects of the Invention

The signal transfer device, the signal transfer method, the signal transfer control device, the signal transfer control method, and the signal transfer program according to the present invention can determine optimum frame interval thresholds for individual signal transfer devices autonomously without any user operation when flows change due to addition of radio devices or communication conditions.

DESCRIPTION OF EMBODIMENTS

Hereinafter, embodiments of a signal transfer device, a signal transfer method, a signal transfer control device, a signal transfer control method, and a signal transfer program according to the present invention will be described with reference to the drawings. In the following description about the embodiments, the signal transfer device corresponds to a device such as a layer 2 switch (L2SW), and the signal transfer control device corresponds to a device for controlling operation of the L2SW or the like.

The signal transfer device described in the embodiments is suitable for the case in which, for example, a network (L2NW) is used as mobile fronthaul (MFH) for forwarding frames among devices that are radio control devices and radio devices separately provided as base stations in a cellular system. Here, since low delays are required to transmit frames among radio control devices and radio devices, the signal transfer device according to the embodiments is based on Time Aware Shaper (TAS). By using TAS, a period that allows high priority traffic frames to be transmitted (high priority signal transmission period) and a period that allows low priority traffic frames to be transmitted (low priority signal transmission period) are periodically repeated; in this configuration, frames to be transmitted and received between a radio control device and a radio device are scheduled to be forwarded in the high priority signal transmission period.

The signal transfer device described in the embodiments has a function of, when no high priority frame arrives for a predetermined time (frame interval threshold), releasing the remainder of the high priority signal transmission period and allocate the remainder to the low priority signal transmission period for the purpose of avoiding the existence of useless remaining time in which no frame is forwarded within the high priority signal transmission period in the case in which, for example, relatively less frames are forwarded. In particular, the signal transfer device described in the embodiments can autonomously set optimum frame interval thresholds for individual signal transfer devices by appropriately changing frame interval thresholds, which are used to determine that no high priority frame arrives, in accordance with frame arrival intervals calculated for the corresponding signal transfer devices constituting the L2NW, when flows change due to addition of radio devices or communication conditions. As a result, the signal transfer device can precisely determine the end of frame of high priority traffic when the frame interval of high priority traffic is relatively long, which prevents erroneous determination that the frame of high priority traffic has ended before a subsequent frame arrives.

Figure 1:
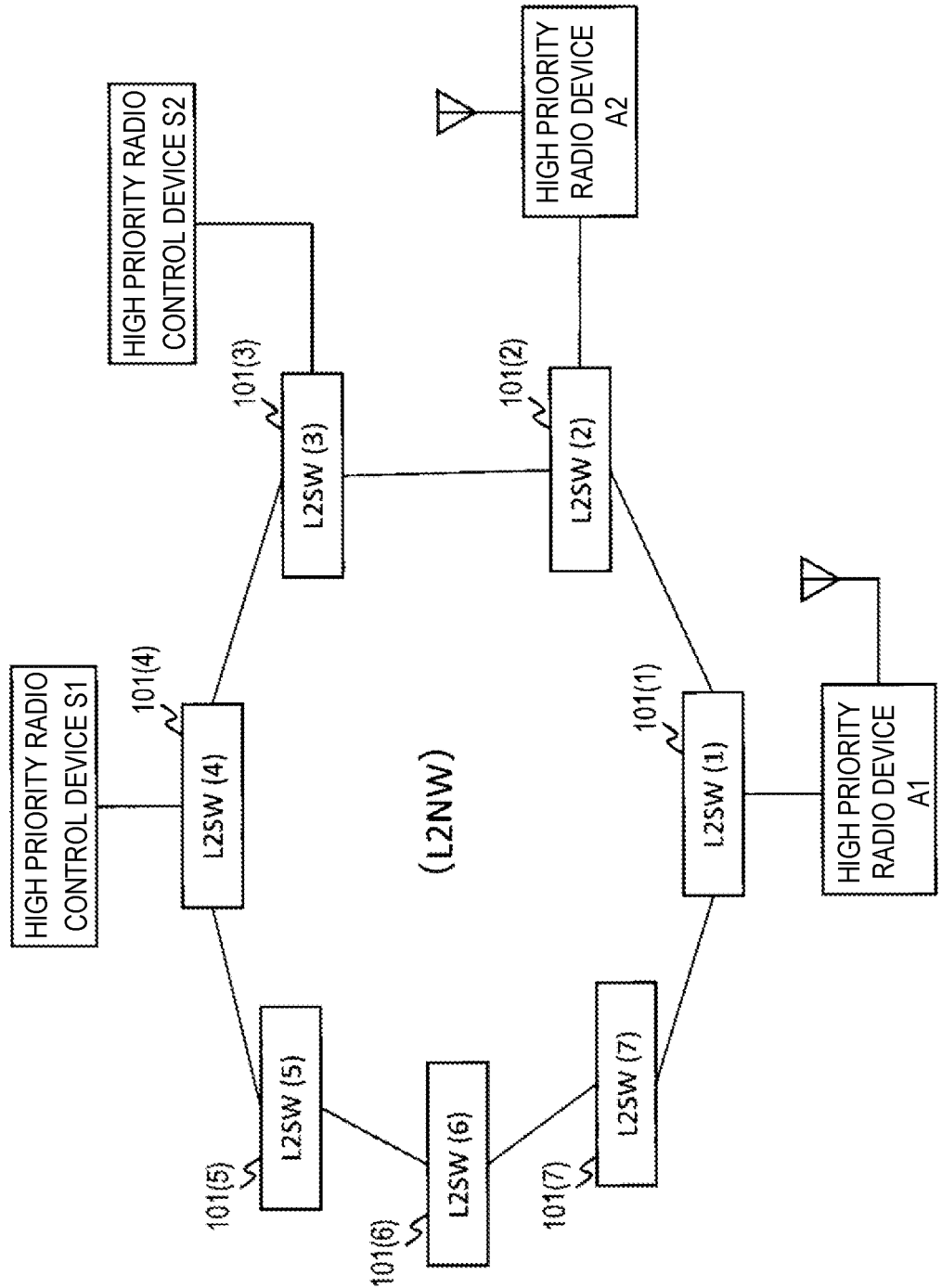
FIG. 1 illustrates an example in which high priority radio devices and high priority radio control devices are accommodated by using an L2NW.
Figure 7:
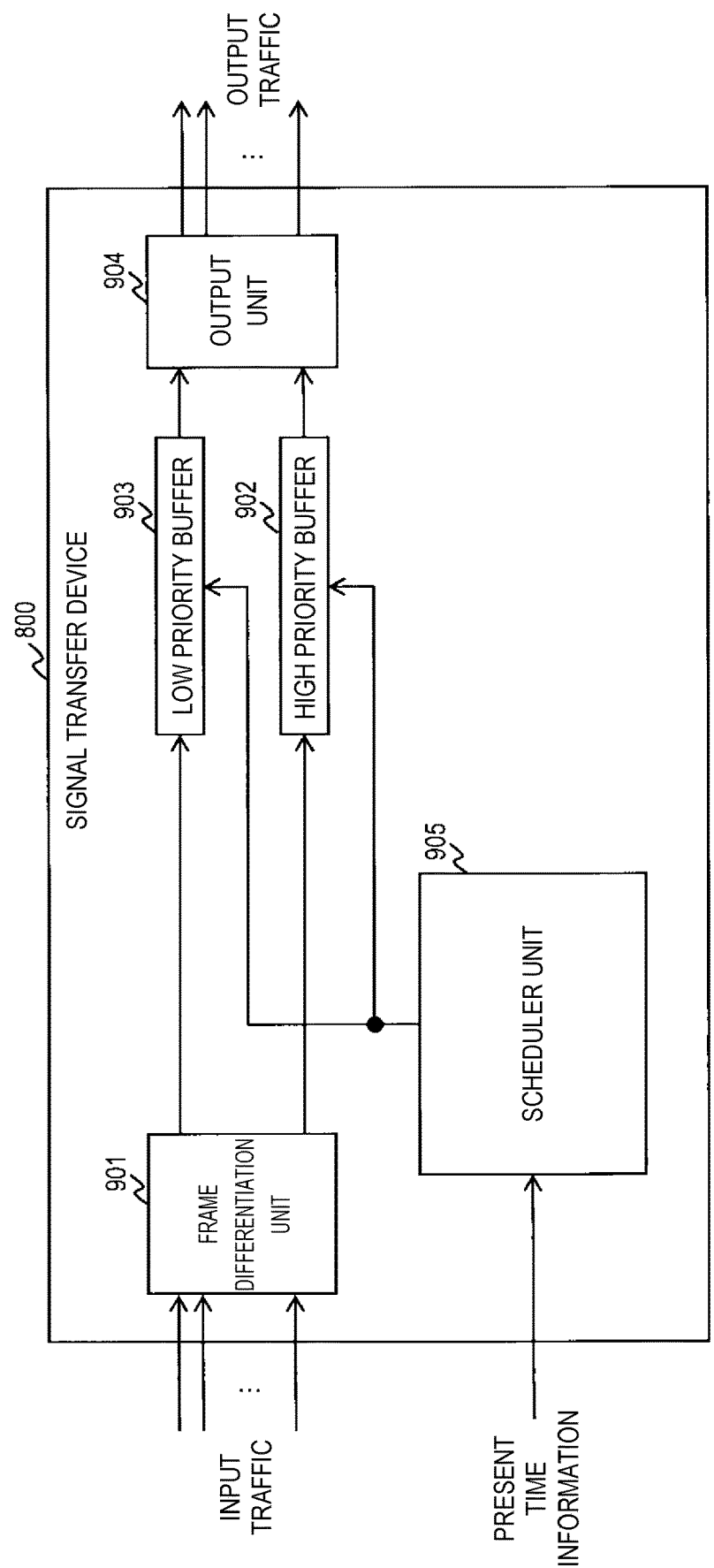
FIG. 7 illustrates an example of a configuration of a usual signal transfer device using TAS.
Figure 8:
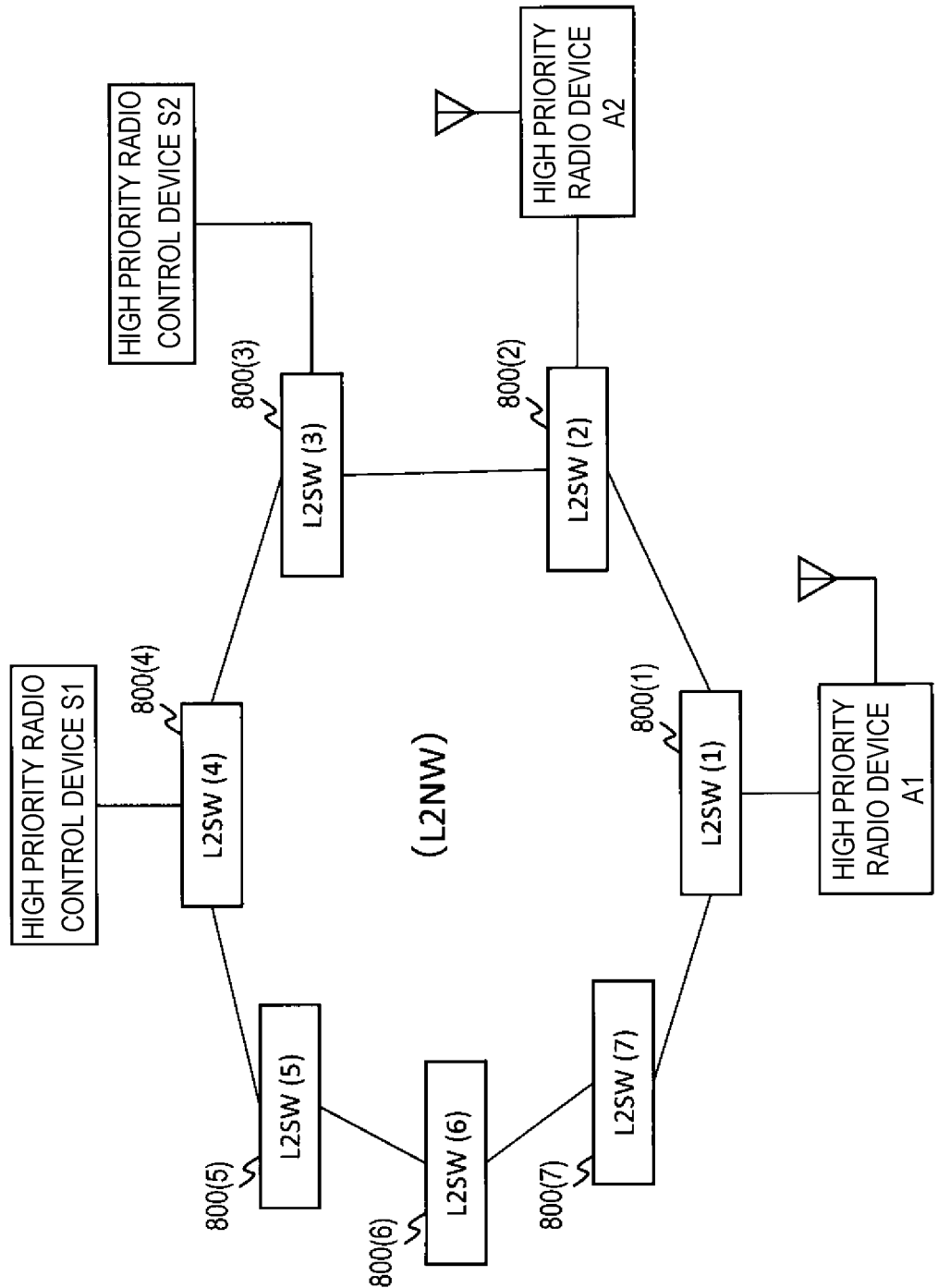
FIG. 8 illustrates an example in which high priority radio devices and high priority radio control devices are accommodated by using an L2NW.
Figure 9:
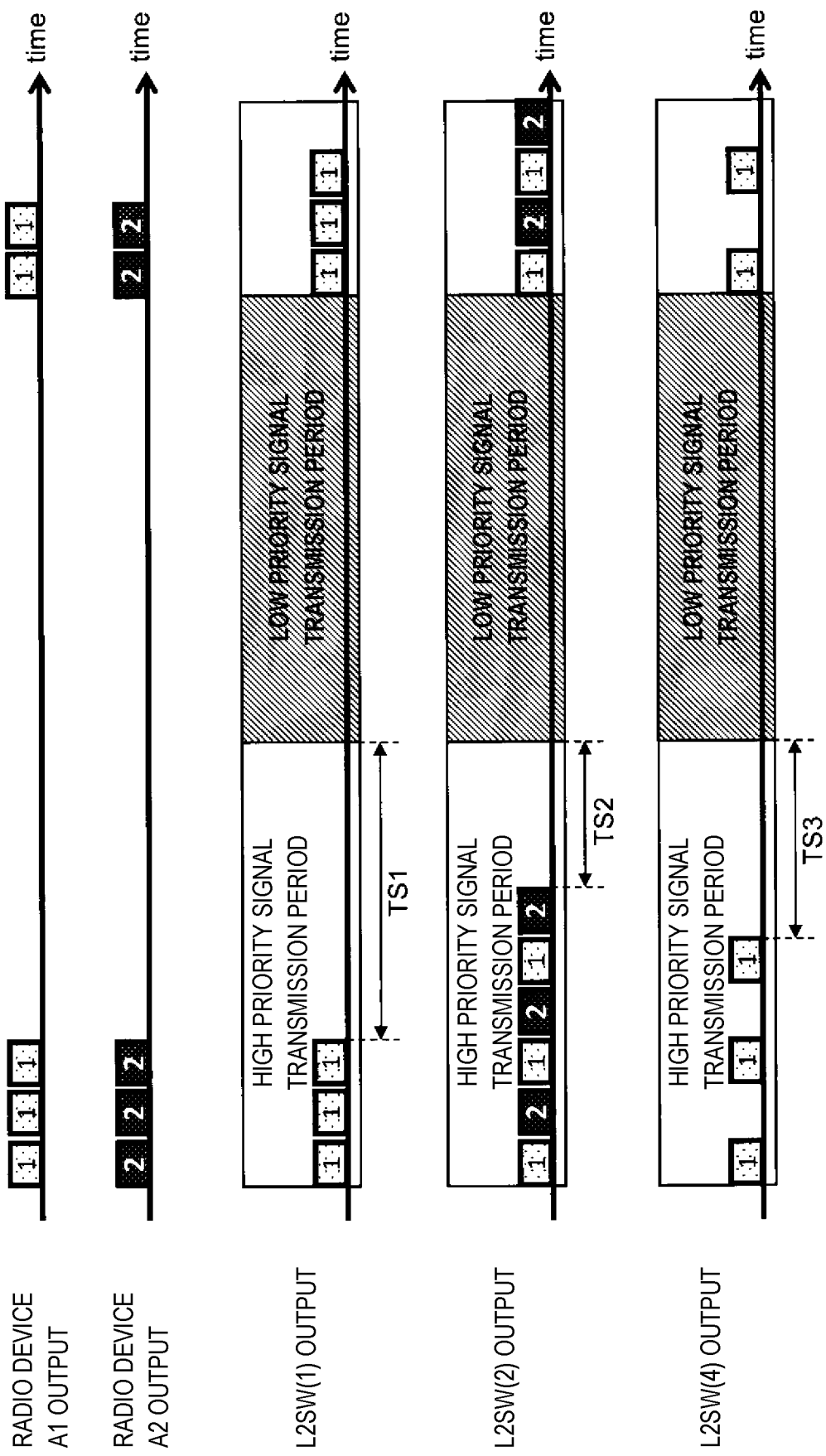
FIG. 9 illustrates an example of traffic streams in the L2NW.
Figure 10:
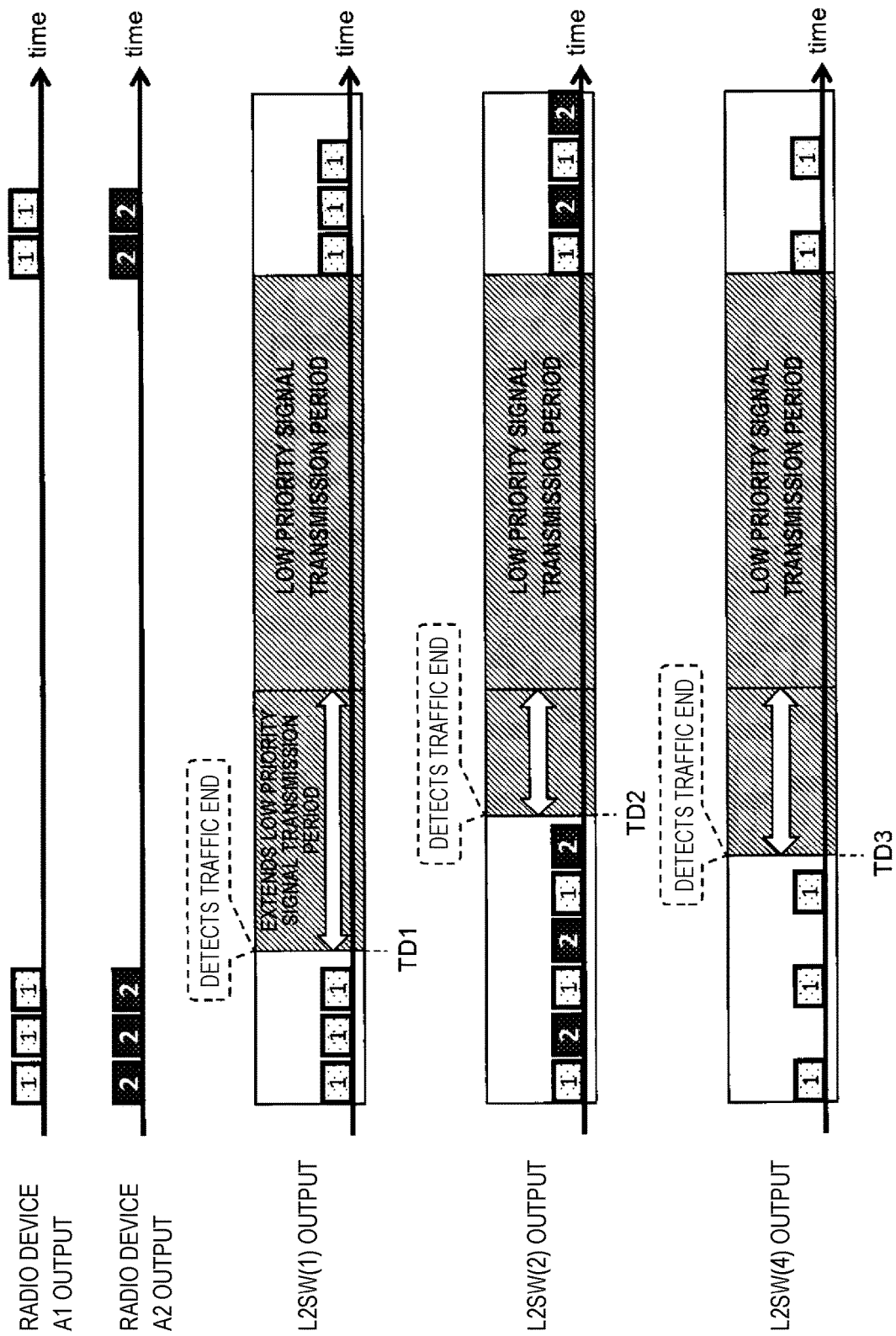
FIG. 10 illustrates an example of traffic streams when a high priority signal transmission period is released.
Figure 11:
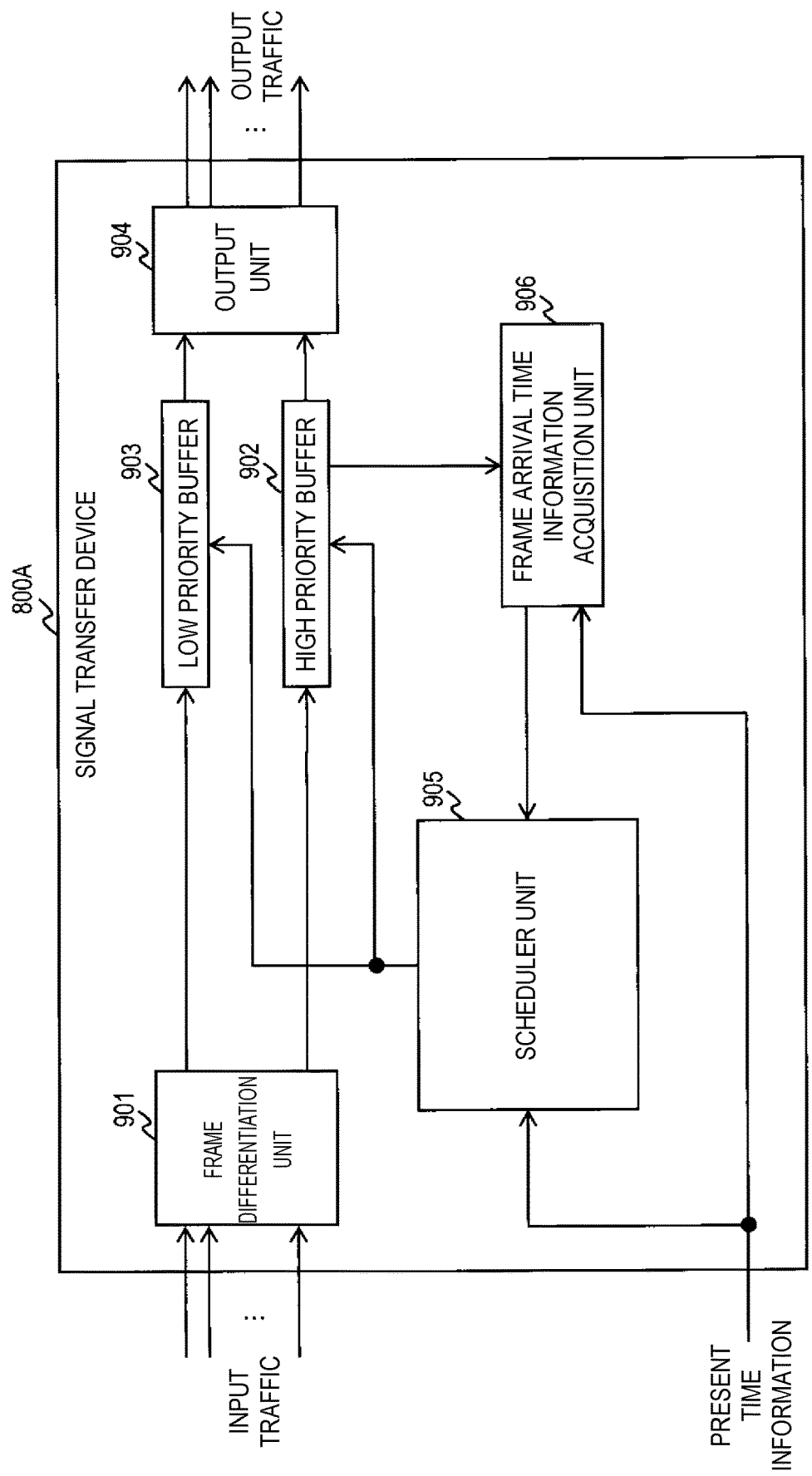
FIG. 11 illustrates an example of a configuration of a known signal transfer device for autonomously detecting the end of high priority traffic.

FIG. 1 illustrates an example in which high priority radio devices (A1, A2) and high priority radio control devices (S1, S2) are accommodated by using an L2NW. While FIG. 1 illustrates a network (L2NW) having a configuration similar to the configuration in FIG. 8 described as a known technology, L2SW(1) to L2SW(7) are not a signal transfer device 800 or a signal transfer device 800A illustrated in FIG. 7 or FIG. 11 as known technologies but a signal transfer device 101 described in the embodiments. In FIG. 1, all the L2SWs are the signal transfer device 101. The respective L2SWs are identified by adding a numeral in parentheses at the end of reference characters. For example, the signal transfer device 101 as the L2SW(1) is indicated as the signal transfer device 101(1).

In FIG. 1, the user can determine which path a traffic stream between a radio device and a radio control device flows along. Here, it is assumed that a path with a minimum number of hops is selected for every traffic. In the example in FIG. 1, an upstream signal from the high priority radio device A1 to the high priority radio control device S1 is forwarded along, for example, a path from the L2SW(1) to the L2SW(2) to the L2SW(3) to the L2SW(4); an upstream signal from the high priority radio device A2 to the high priority radio control device S2 is forwarded along, for example, a path from the L2SW(2) to the L2SW(3).

First Embodiment

Figure 2:
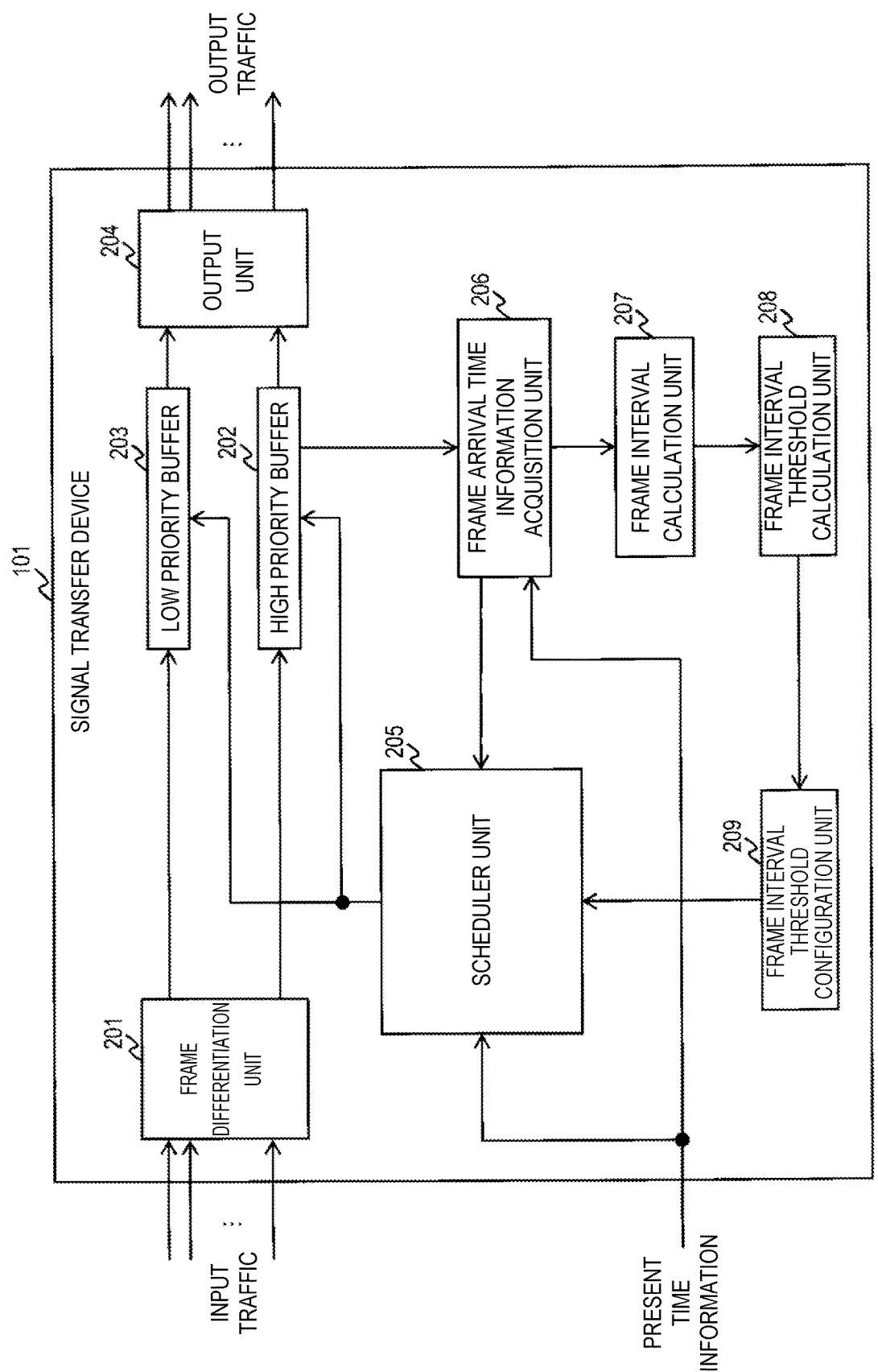
FIG. 2 illustrates an example of a configuration of a signal transfer device according to a first embodiment.

FIG. 2 illustrates an example of a configuration of the signal transfer device 101 according to the first embodiment. In FIG. 2, the signal transfer device 101 includes a frame differentiation unit 201, a high priority buffer 202, a low priority buffer 203, an output unit 204, a scheduler unit 205, a frame arrival time information acquisition unit 206, a frame interval calculation unit 207, a frame interval threshold calculation unit 208, and a frame interval threshold configuration unit 209.

The frame differentiation unit 201 distinguishes frames (input traffic) received from other signal transfer devices, radio devices, radio control devices, and the like in accordance with priority stored in the frame header to output high priority frames to the high priority buffer 202 and low priority frames to the low priority buffer 203. For example, in the case in which the signal transfer device 101 is the L2SW(2) in FIG. 1, the frame differentiation unit 201 distinguishes frames as input traffic received from the L2SW (1) and frames as input traffic received from the high priority radio device A2 to route the frames to the high priority buffer 202 or the low priority buffer 203. The frame differentiation unit 201 may use, for example, a VLAN Identifier (VID), a media access control (MAC) address, or an internet protocol (IP) address to distinguish frames.

The high priority buffer 202 is a buffer memory for storing high priority frames distinguished by the frame differentiation unit 201. In accordance with instructions provided by the scheduler unit 205, the high priority buffer 202 receives and temporarily retain high priority frames output by the frame differentiation unit 201.

The low priority buffer 203 is a buffer memory for storing low priority frames distinguished by the frame differentiation unit 201. In accordance with instructions provided by the scheduler unit 205, the low priority buffer 203 receives and temporarily retain low priority frames output by the frame differentiation unit 201.

The output unit 204 outputs high or low priority frames read by the scheduler unit 205 from the high priority buffer 202 or the low priority buffer 203 to a forwarding destination. For example, in the case in which the signal transfer device 101 is the L2SW(3) illustrated in FIG. 1, the output unit 204 outputs the frames from the high priority radio device A1 to the L2SW(4) and the frames from the high priority radio device A2 to the high priority radio control device S2.

The scheduler unit 205 provides, in accordance with present time information, an output stop instruction for the high priority buffer 202 and an output instruction for the low priority buffer 203 during a low priority signal transmission period; in contrast, the scheduler unit 205 provides, in accordance with present time information, an output instruction for the high priority buffer 202 and an output stop instruction for the low priority buffer 203 during a high priority signal transmission period. The scheduler unit 205 operates as a control unit for control processing the signal transfer device 101. Details of operation of the scheduler unit 205 will be described later.

The frame arrival time information acquisition unit 206 obtains the arrival time information of a particular frame most recently arrived at the high priority buffer 202 with reference to present time information obtained by a clock outside or inside the signal transfer device 101 (frame arrival time information acquisition processing).

The frame interval calculation unit 207 calculates intervals between frames input to the high priority buffer 202 in chronological order with respect to each frame stream from a particular source in accordance with corresponding frame arrival time information obtained by the frame arrival time information acquisition unit 206 (frame interval calculation processing). For example, in the case in which the signal transfer device 101 is the L2SW(3) in FIG. 1, the frame interval calculation unit 207 calculates frame intervals between frames from the high priority radio device A1 and frame intervals between frames from the high priority radio device A2.

The frame interval threshold calculation unit 208 calculates a frame interval threshold in accordance with the frame intervals calculated by the frame interval calculation unit 207 (frame interval threshold calculation processing). The scheduler unit 205 uses the frame interval threshold to detect when a series of frames have been completely transmitted from a particular source in a burst manner. Details of operation of the frame interval threshold calculation unit 208 will be described later.

The frame interval threshold configuration unit 209 provides a frame interval threshold configuration instruction for the scheduler unit 205 in accordance with a frame interval threshold calculated by the frame interval threshold calculation unit 208 (frame interval threshold configuration processing).

Next, details of operation of the scheduler unit 205 will be described. When no frame arrives when the time of a preset frame interval threshold or longer elapses after a frame arrival time indicated by information obtained by the frame arrival time information acquisition unit 206, the scheduler unit 205 provides an output stop instruction for the high priority buffer 202 and an output instruction for the low priority buffer 203 and changes a frame interval threshold in accordance with an instruction provided by the frame interval threshold configuration unit 209. Here, it is assumed that an initial value of the frame interval threshold is preset because the frame interval threshold configuration unit 209 has not configured the frame interval threshold at the start of operation of the signal transfer device 101 and before the start of reception of frames. It is also assumed that the initial value of the frame interval threshold is set to a value sufficiently larger than a realistic frame interval such as a maximum value that can be achieved on a memory (or infinity).

As the information of the frame arrival time obtained by the frame arrival time information acquisition unit 206, a frame leading end arrival time and a frame trailing end arrival time can be considered. In the case in which it is possible to obtain information of both the frame leading end arrival time and the frame trailing end arrival time, the frame interval calculation unit 207 can calculate the frame interval as a difference between the frame trailing end arrival time of a particular frame and the frame leading end arrival time of a subsequent frame. This difference equals an inter frame gap (IFG). By contrast, in the case in which the frame arrival time information acquisition unit 206 can obtain information of only either the frame leading end arrival time or the frame trailing end arrival time, the frame interval calculation unit 207 can calculate the frame interval as a difference between the frame leading end arrival time of a particular frame and the frame leading end arrival time of a subsequent frame or a difference between the frame trailing end arrival time of a particular frame and the frame trailing end arrival time of a subsequent frame. These differences equal the total value of a frame length and an IFG.

Next, details of operation of the frame interval threshold calculation unit 208 will be described. The frame interval threshold calculation unit 208 can set the frame interval threshold to a longest interval or an average interval of the frame intervals calculated by the frame interval calculation unit 207. Alternatively, the frame interval threshold calculation unit 208 can set the frame interval threshold to the total value of a longest interval and a margin or the total value of an average interval and a margin, where the longest interval and the average interval are obtained from the frame intervals calculated by the frame interval calculation unit 207. In the case described above, the calculation target may be a frame interval determined across a low priority signal transmission period between a particular high priority signal transmission period and a subsequent high priority signal transmission period. For example, the frame interval may be calculated as an interval between the final frame of a particular high priority signal transmission period and the first frame of a subsequent high priority signal transmission period. Hence, it is desirable that, by setting a threshold determining the calculated frame interval as an out-of-target interval (referred to as an observation threshold), when a calculated frame interval exceeds the observation threshold, the frame interval threshold calculation unit 208 excludes the calculated frame interval and determines a largest or average value of frame interval values less than the observation threshold.

The observation threshold can be identical in length to the low priority signal transmission period. In the case in which the length of the low priority signal transmission period varies as in the present embodiment, for example, a minimum or average value of the length of the low priority signal transmission period can be used as a standard length of the low priority signal transmission period. Alternatively, the calculation of frame interval may be suspended when the high priority signal transmission period is changed to the low priority signal transmission period; and the calculation of frame interval may be restarted from a first frame after the low priority signal transmission period is changed to the high priority signal transmission period. Furthermore, a largest or average value may be calculated in accordance with frame intervals in one high priority signal transmission period. The frame interval threshold calculation unit 208 can set any cycle to calculate a frame interval threshold.

The frame interval threshold configuration unit 209 can provide a configuration instruction whenever information of a frame interval threshold calculated by the frame interval threshold calculation unit 208 is obtained or after a plurality of pieces of information have been obtained. For example, when the frame interval calculation unit 207 or the frame interval threshold calculation unit 208 causes a temporary malfunction and a particular value significantly different from other frame interval thresholds is thus temporarily notified, it is possible to hinder malfunctions by obtaining a plurality of pieces of information of frame interval thresholds and excluding the particular value significantly different from the other frame interval thresholds.

(Case of Adding Radio Device)

Figure 3:
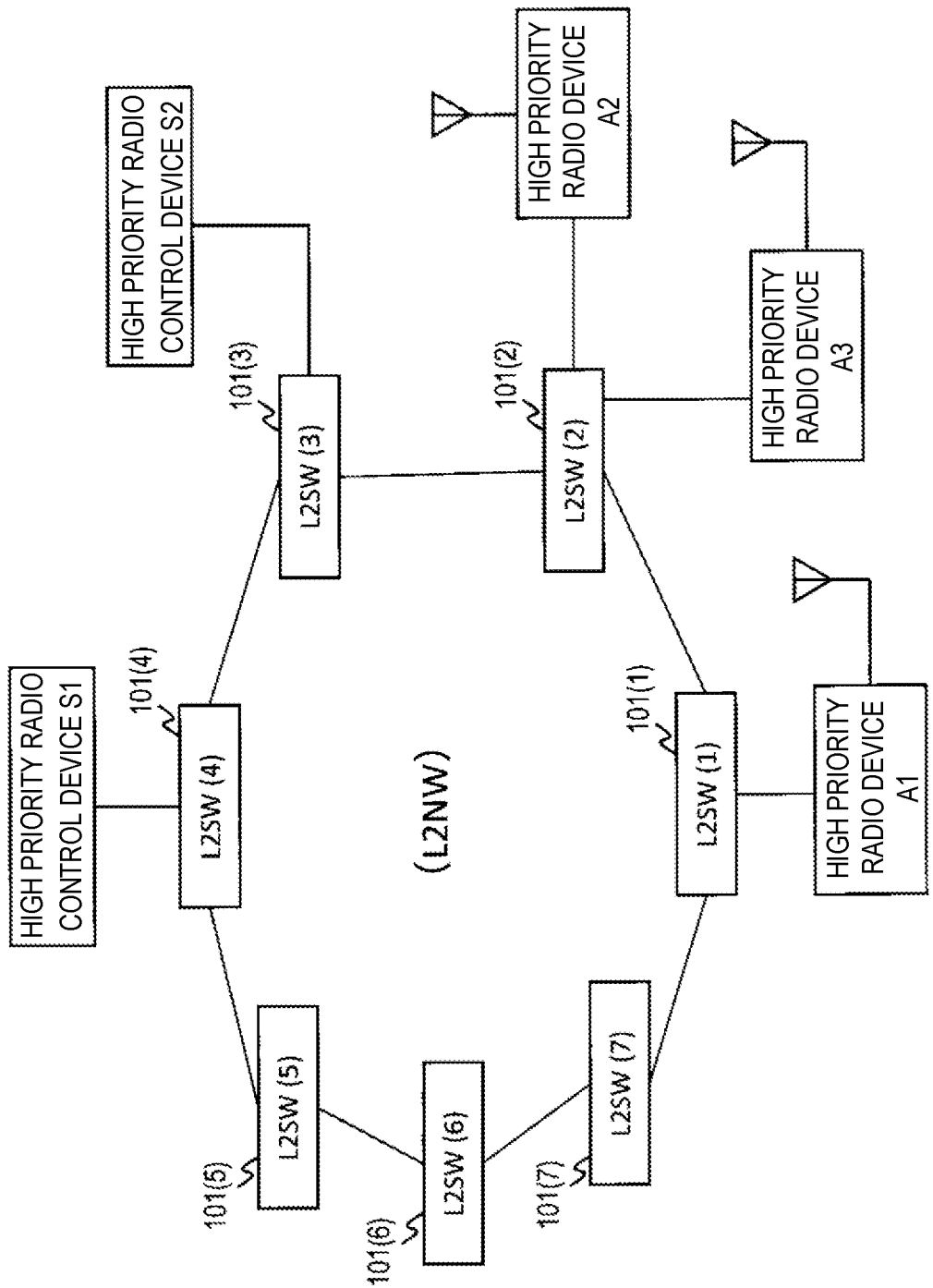
FIG. 3 illustrates an example in which the L2NW additionally includes a new high priority radio device.

FIG. 3 illustrates an example in which the L2NW additionally includes a high priority radio device A3. In FIG. 3, the blocks with reference numerals identical to those in FIG. 1 are identical to or similar to the blocks in FIG. 1. Since in FIG. 3 the high priority radio device A3 is newly added and a flow is thus added, the frame interval may be extended at an L2SW on the path along which the additional flow flows. With this respect, the signal transfer device 101 according to the present embodiment can calculate a frame interval after change autonomously without any user operation so as to set again an appropriate frame interval threshold. For example, in the L2NW in FIG. 3, the high priority radio device A3 belonging to the high priority radio control device S2 is newly added under the L2SW(2) under which the high priority radio device A2 is also provided. In this case, not only frames from the high priority radio device A1 and the high priority radio device A2 but also frames from the high priority radio device A3 are alternately output in the direction from the L2SW(2) to the L2SW(3), and as a result, when frames from the high priority radio device A1 are brought into focus, the frame interval is extended. Thus, it is necessary to increase the frame interval threshold for the L2SW(4). With this respect, the signal transfer device 101 according to the present embodiment can autonomously set again the frame interval threshold by regularly calculating the frame interval, and consequently, no malfunction occurs when the frame interval is extended. It should be noted that, for the period from when a radio device is added to when the frame interval threshold is reconfigured, the signal transfer device 101 according to the present embodiment still operates with an original frame interval threshold configured before the radio device is added, and thus, the high priority signal transmission period may be released while high priority traffic still flows; however, it is possible to reduce the effect by setting the cycle for reconfiguring the frame interval threshold to a relatively short cycle. Alternatively, by adding, when a new flow is detected, a process of setting the frame interval threshold again to, for example, a maximum value that can be achieved on a memory (or infinity), it is possible to prevent the high priority signal transmission period from being released when high priority traffic still flows, although the releasable length of the high priority signal transmission period is temporarily shortened. When a new flow is detected denotes when, for example, a frame having a MAC address from which no traffic has been forwarded is detected.

(Case of Removing Radio Device)

When a radio device is removed so that a corresponding flow is eliminated, the frame interval at an L2SW on the path along which the corresponding flow flows may be shortened. With this respect, the signal transfer device 101 according to the present embodiment can calculate a frame interval after change autonomously without any user operation so as to set again an appropriate frame interval threshold. For example, it is assumed that the high priority radio device A2 belonging to the high priority radio control device S2 is removed from the L2NW in FIG. 1. In this case, since only frames from the high priority radio device A1 are output in the direction from the L2SW(2) to the L2SW(3), when the frames from the high priority radio device A1 are brought into focus, the frame interval is shortened. Thus, it is necessary to decrease the frame interval threshold for the L2SW(4). With this respect, the signal transfer device 101 according to the present embodiment can autonomously set again the frame interval threshold by regularly calculating the frame interval, and consequently, processing is properly carried out when the frame interval is shortened.

Figure 4:
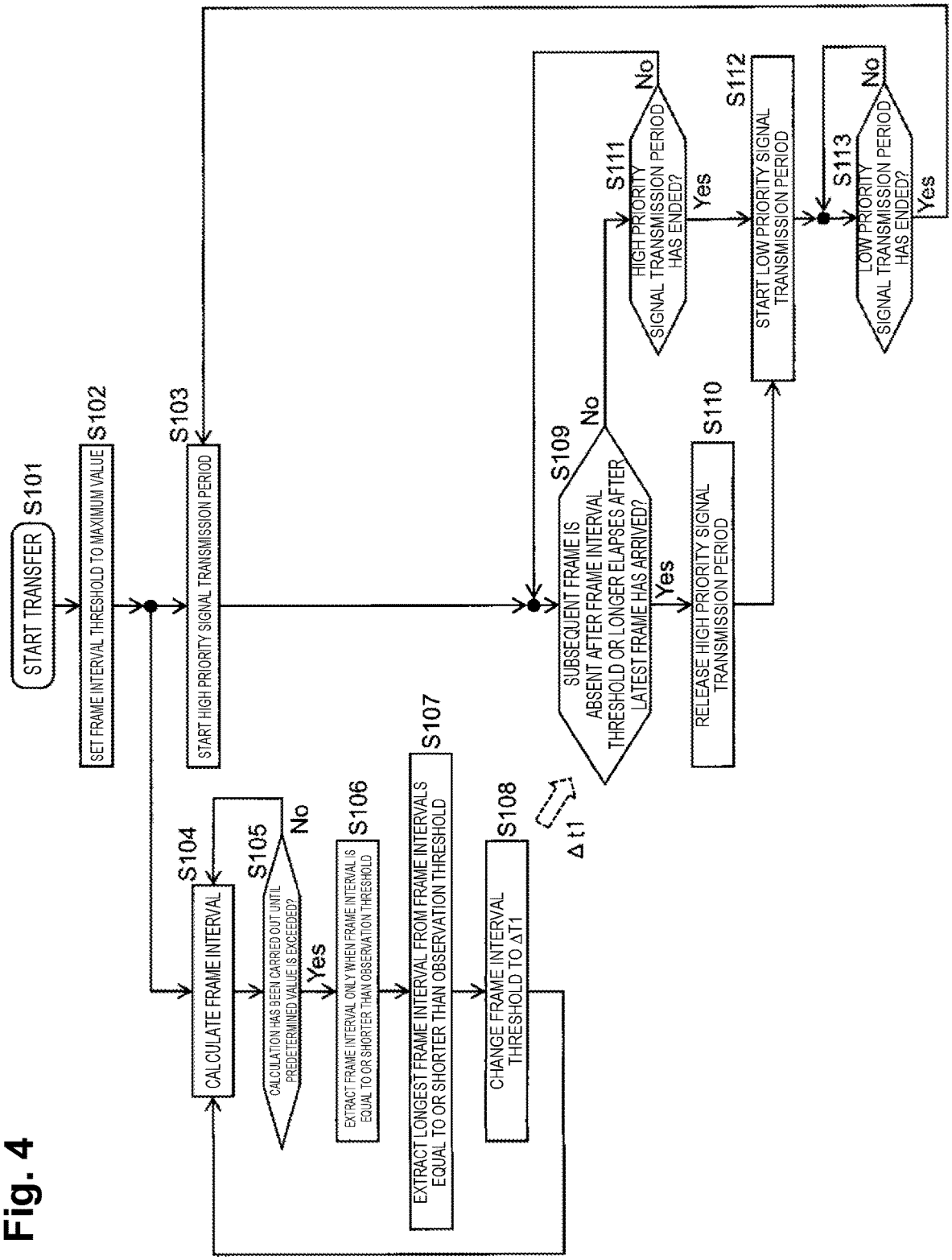
FIG. 4 illustrates an example of a process of the signal transfer device according to the first embodiment.

FIG. 4 illustrates an example of a process of the signal transfer device 101 according to the first embodiment. The process illustrated in FIG. 4 is performed by the units of the signal transfer device 101 illustrated in FIG. 2.

Figure 5:
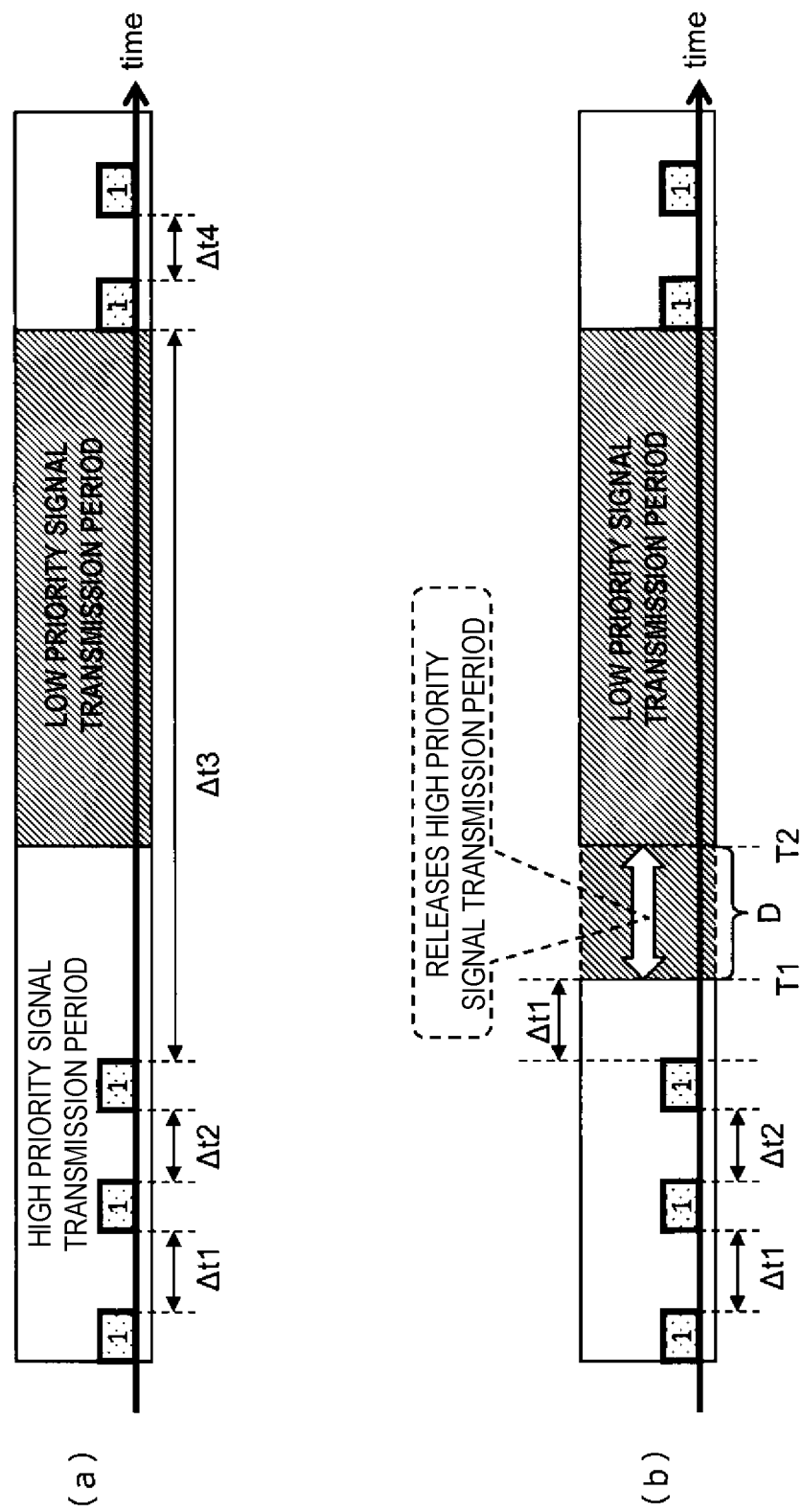
FIG. 5 illustrates an example of an operation of the signal transfer device according to the first embodiment.

FIG. 5 illustrates an example of an operation of the signal transfer device 101 according to the first embodiment, in which FIG. 5($a$) illustrates an example of frame intervals and FIG. 5($b$) illustrates an example of an operation in which the high priority signal transmission period is released.

Hereinafter, the process of the signal transfer device 101 according to the present embodiment illustrated in FIG. 4 will be described in detail with reference to FIG. 5.

In step S101, the signal transfer device 101 starts transfer.

In step S102, the scheduler unit 205 sets the frame interval threshold to a sufficiently large value such as a maximum value that can be achieved on a memory (or infinity).

In step S103, the scheduler unit 205 starts processing for the high priority signal transmission period. It is assumed that the length of the high priority signal transmission period and the length of the low priority signal transmission period are preset in the scheduler unit 205 and the preset length of the high priority signal transmission period and the preset length of the low priority signal transmission period are alternately allocated in a repeating manner.

In step S104, the frame arrival time information acquisition unit 206 obtains information of the arrival time of a particular frame arrived at the high priority buffer 202, and the frame interval calculation unit 207 calculates a frame interval from a preceding frame immediately before the particular frame.

In step S105, after calculating a frame interval, the frame interval calculation unit 207 determines at least whether the number of calculated frame intervals exceeds a predetermined value or whether the calculated time exceeds a predetermined value; in the case in which the predetermined value is not exceeded, the processing in step S104 is repeated; in the case in which the predetermined value is exceeded, the process proceeds to step S106.

In step S106, the frame interval threshold calculation unit 208 determines whether the frame interval calculated in step S104 exceeds an observation threshold to extract the frame interval when the frame interval is equal to or shorter than the observation threshold or exclude the frame interval when the frame interval exceeds the observation threshold. For example, in FIG. 5($a$), when it is assumed that the length of the low priority signal transmission period is set as the observation threshold, only a frame interval $\Delta t3$ out of frame intervals $\Delta t1$, $\Delta t2$, $\Delta t3$, and $\Delta t4$ exceeds the observation threshold, and thus, the frame interval threshold calculation unit 208 excludes the frame interval $\Delta t3$.

In step S107, the frame interval threshold calculation unit 208 extracts a longest frame interval from frame intervals equal to or shorter than the observation threshold. For example, in FIG. 5($a$), a longest frame interval out of the frame intervals $\Delta t1$, $\Delta t2$, and $\Delta t4$ is extracted. Here, when these frame intervals are in the following relationship: $\Delta t1 > \Delta t2 > \Delta t4$, the frame interval $\Delta t1$ is extracted as the longest frame interval.

In step S108, the frame interval threshold configuration unit 209 changes the frame interval threshold and sets the frame interval threshold for the scheduler unit 205. For example, in FIG. 5($b$), the frame interval threshold is changed to $\Delta t1$. In accordance with the frame interval threshold $\Delta t1$, the scheduler unit 205 performs processing of releasing the high priority signal transmission period. It should be noted that the processing operations in steps S104 to S108 are performed in parallel with frame transfer processing, and the frame interval threshold changed in the processing operation in step S108 is referred to in the processing operation in step S109.

In step S109, the scheduler unit 205 determines whether, after the time of the frame interval threshold or longer elapses after a latest frame has arrived, no subsequent frame arrives. In the case in which no frame arrives for the frame interval threshold or longer, the scheduler unit 205 proceeds to step S110; in the case in which any frame arrives, the scheduler unit 205 proceeds to step S111. For example, in FIG. 5(b), the scheduler unit 205 determines whether a subsequent frame arrives after Δt1 or longer elapses after the third frame 1 has finally arrived; since no frame subsequently arrives, the scheduler unit 205 proceeds to step S110.

In step S110, the scheduler unit 205 releases the high priority signal transmission period. For example, in FIG. 5(b), the scheduler unit 205 releases a period D (period from a time T1 to a time T2) that is the remainder of the high priority signal transmission period.

In step S111, the scheduler unit 205 determines whether the high priority signal transmission period has ended. In the case in which the high priority signal transmission period has ended, the scheduler unit 205 proceeds to step S112; in the case in which the high priority signal transmission period has not ended, the scheduler unit 205 returns to step S109 and repeats the same processing.

In step S112, the scheduler unit 205 starts the low priority signal transmission period. In the case in which the high priority signal transmission period is released in step S109 and the case in which the predetermined high priority signal transmission period ends in step S111, the low priority signal transmission period starts. For example, in FIG. 5(b), in the case in which the high priority signal transmission period is released in step S110, the low priority signal transmission period starts from the time T1; in the case in which the predetermined high priority signal transmission period ends in step S111, the low priority signal transmission period starts from the time T2.

In step S113, the scheduler unit 205 determines whether the low priority signal transmission period has ended. In the case in which the low priority signal transmission period has not ended, step S113 is repeated. In the case in which the low priority signal transmission period has ended, the process of the signal transfer device 101 returns to step S103 and the same processing is repeated.

As described above, after the frame interval threshold elapses after the arrival time of the final frame of high priority traffic, the signal transfer device 101 according to the present embodiment releases the high priority signal transmission period, such that the low priority signal transmission period can be extended. Particularly, since the signal transfer device 101 according to the present embodiment calculates the frame interval and changes the frame interval threshold, when the frame interval increases, the frame interval threshold also increases; similarly, when the frame interval decreases, the frame interval threshold also decreases. As such, it is possible to use an optimum frame interval threshold in response to changes in condition such as addition or removal of radio device.

Incidentally, the method of presetting the frame interval threshold as the method described as a known technology can be applied to only the case in which traffic streams from the L2SW and the high priority radio device flow in a burst manner, the frame intervals are almost the same, and the value is specified in advance. This means that, in the case in which frame intervals in traffic streams output from the L2SW and the high priority radio device are not specified in advance and the frame intervals differ from each other, the frame interval threshold cannot be determined. By contrast, the signal transfer device 101 according to the present embodiment can autonomously change the frame interval threshold in accordance with frame intervals in traffic streams output from the L2SW and the high priority radio device, in the case in which the frame intervals in traffic streams output from the L2SW and the high priority radio device are not specified in advance and the frame intervals differ from each other.

With this configuration, the signal transfer device 101 according to the present embodiment can prevent the high priority signal transmission period from being released although high priority traffic frames have not ended and from being uselessly maintained although high priority traffic frames have ended.

While the signal transfer device 101 according to the present embodiment includes the blocks illustrated in the FIG. 2, it is possible to perform the processing operations of the blocks by running a program of the signal transfer method corresponding to the processing operations of the blocks with the use of a computer. The program may be provided by being stored in a storage medium or through a network.

Second Embodiment

The signal transfer device 101 according to the first embodiment has been described as an example in which the signal transfer device per se calculates the frame interval threshold and determines whether to release the high priority signal transmission period. In a second embodiment, not the signal transfer device per se but the signal transfer control device remotely connected to the signal transfer device calculates the frame interval threshold and determines whether to release the high priority signal transmission period so as to control the signal transfer devices.

Figure 6:
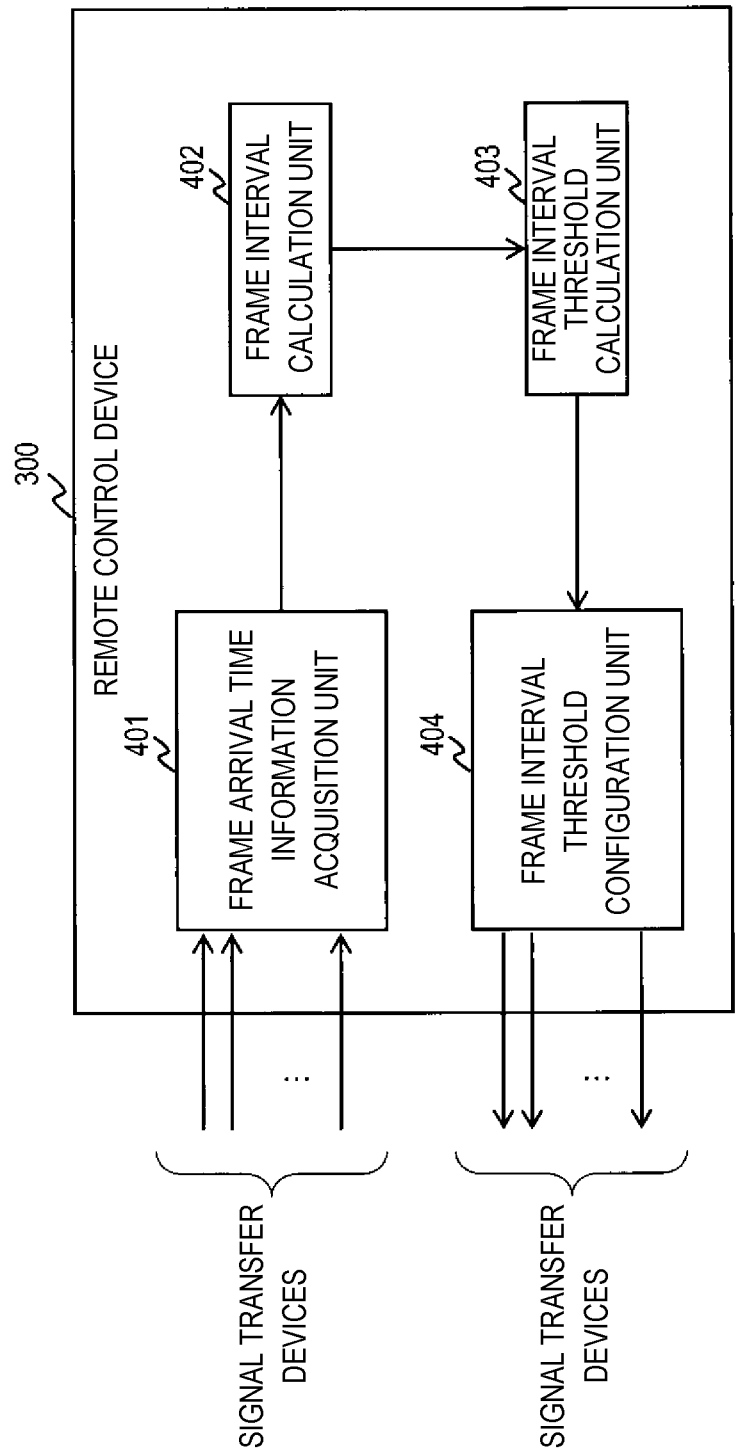
FIG. 6 illustrates an example of a configuration of a remote control device according to a second embodiment.

FIG. 6 illustrates an example of a configuration of a remote control device 300 according to the second embodiment. The remote control device 300 corresponds to a signal transfer control device for controlling a signal transfer device using TAS.

In FIG. 6, the remote control device 300 includes a frame arrival time information acquisition unit 401, a frame interval calculation unit 402, a frame interval threshold calculation unit 403, and a frame interval threshold configuration unit 404. The remote control device 300 corresponds to a signal transfer control device that controls a plurality of signal transfer devices 101 from a remote area away from installation locations of the plurality of signal transfer devices 101 in the L2NW.

The frame arrival time information acquisition unit 401 obtains information of frame arrival times from the signal transfer devices.

The frame interval calculation unit 402 calculates frame intervals with respect to each frame stream from a particular source in accordance with the information of frame arrival times obtained by the frame arrival time information acquisition unit 401. For example, in the case in which the remote control device 300 controls the L2SW(3) in FIG. 1, the frame interval calculation unit 402 calculates frame intervals between frames from the high priority radio device A1 and frame intervals between frames from the high priority radio device A2.

The frame interval threshold calculation unit 403 calculates a frame interval threshold in accordance with the frame intervals calculated by the frame interval calculation unit 402. The frame interval threshold calculation unit 403 performs almost the same operation as the operation of the frame interval threshold calculation unit 208 illustrated in FIG. 2.

The frame interval threshold configuration unit 404 provides frame interval threshold configuration instructions for the signal transfer devices in accordance with frame interval thresholds calculated by the frame interval threshold calculation unit 403.

The signal transfer device used in the second embodiment has a function of notifying the remote control device 300 of information of frame arrival time. For example, three blocks of the frame interval calculation unit 207, the frame interval threshold calculation unit 208, and the frame interval threshold configuration unit 209 are removed from the configuration of the signal transfer device 101 in FIG. 2 while only the frame arrival time information acquisition unit 206 is included in the configuration of the signal transfer device 101; the scheduler unit 205 notifies the remote control device 300 of information of frame arrival time obtained by the frame arrival time information acquisition unit 206. The remote control device 300 can be connected to the individual signal transfer devices through dedicated lines or a dedicated network, or, for example, the L2NW illustrated in FIG. 1.

It is assumed that the scheduler unit of the signal transfer device used in the second embodiment has a function of changing the frame interval threshold in accordance with an instruction provided by the frame interval threshold configuration unit 404 of the remote control device 300, similarly to the scheduler unit 205 of the signal transfer device 101 according to the first embodiment.

While the remote control device 300 according to the present embodiment includes the blocks illustrated in the FIG. 6, it is possible to perform the processing operations of the blocks by running a program of the signal transfer control method corresponding to the processing operations of the blocks with the use of a computer. The program may be provided by being stored in a storage medium or through a network.

While the first and second embodiments are described by using a ring network configuration as an example, the present invention is not limited to this configuration but may be applied to other network configurations, such as a honeycomb network and a mesh network.

As described above as the embodiments, the signal transfer device, the signal transfer method, the signal transfer control device, the signal transfer control method, and the signal transfer program according to the present invention can determine optimum frame interval thresholds for individual signal transfer devices autonomously without any user operation by setting optimum frame interval thresholds in accordance with frame arrival intervals calculated for corresponding signal transfer devices, when flows change due to addition of radio devices or communication conditions.

REFERENCE SIGNS LIST 101, 800, 800A Signal transfer device
201, 901 Frame differentiation unit
202, 902 High priority buffer
203, 903 Low priority buffer
204, 904 Output unit
205, 905 Scheduler unit
206, 401, 906 Frame arrival time information acquisition unit
207, 402 Frame interval calculation unit
208, 403 Frame interval threshold calculation unit
209, 404 Frame interval threshold configuration unit
300 Remote control device
A1, A2, A3 High priority radio device
S1, S2 High priority radio control device

The invention claimed is:

1. A signal transfer device for forwarding high priority traffic frames and low priority traffic frames, comprising:
   a control circuitry configured to periodically switch between a period that allows high priority traffic frames to be transmitted and a period that allows low priority traffic frames to be transmitted and, when the control circuitry detects that no high priority traffic frame arrives for a preset frame interval threshold or longer in the period that allows high priority traffic frames to be transmitted, release the period that allows high priority traffic frames to be transmitted and allocate the released period to the period that allows low priority traffic frames to be transmitted;
   a frame arrival time information acquisition circuitry configured to obtain information of frame arrival times of the high priority traffic frames;
   a frame interval calculation circuitry configured to calculate, in accordance with the information of frame arrival times obtained by the frame arrival time information acquisition circuitry, frame intervals between frames of the high priority traffic frames input in chronological order;
   a frame interval threshold calculation circuitry configured to calculate a new value for the preset frame interval threshold in accordance with the frame intervals excluding a frame interval including the period that allows low priority traffic to be transmitted; and
   a frame interval threshold configuration circuitry configured to change the frame interval threshold to the new value for the preset frame interval threshold.

2. A signal transfer method for forwarding high priority traffic frames and low priority traffic frames, comprising:
   control processing of periodically switching between a period that allows high priority traffic frames to be transmitted and a period that allows low priority traffic frames to be transmitted and, when the control processing detects that no high priority traffic frame arrives for a preset frame interval threshold or longer in the period that allows high priority traffic frames to be transmitted, releasing the period that allows high priority traffic frames to be transmitted and allocating the released period to the period that allows low priority traffic frames to be transmitted;
   frame arrival time information acquisition processing of obtaining information of frame arrival times of the high priority traffic frames; frame interval calculation processing of calculating, in accordance with the information of frame arrival times obtained by the frame arrival time information acquisition processing, frame intervals between frames of the high priority traffic frames input in chronological order;
   frame interval threshold calculation processing of calculating a new value for the preset frame interval threshold in accordance with the frame intervals excluding a frame interval including the period that allows low priority traffic to be transmitted; and
   frame interval threshold configuration processing of changing the frame interval threshold to the new value for the preset frame interval threshold.

3. A non-transitory computer-readable storage medium storing a signal transfer program for causing a computer to execute a process of the signal transfer method according to claim 2.

4. A signal transfer control device for controlling a plurality of signal transfer devices, each signal transfer device configured to, when the signal transfer device periodically switches between a period that allows high priority traffic frames to be transmitted and a period that allows low priority traffic frames to be transmitted so as to forward high priority traffic frames and low priority traffic frames, in a case in which the signal transfer device detects that no high priority traffic frame arrives for a preset frame interval threshold or longer in the period that allows high priority traffic frames to be transmitted, release the period that allows high priority traffic frames to be transmitted and allocate the released period to the period that allows low priority traffic frames to be transmitted, the signal transfer control device comprising:
- a frame interval calculation circuitry configured to obtain from the plurality of signal transfer devices, information of arrival times of high priority traffic frames and calculate, for the respective signal transfer devices, frame intervals between frames of the high priority traffic frames input in chronological order;
- a frame interval threshold calculation circuitry configured to calculate, for the respective signal transfer devices, new values for the preset frame interval thresholds in accordance with the frame intervals excluding a frame interval including the period that allows low priority traffic to be transmitted; and
- a frame interval threshold configuration circuitry configured to send notifications to the plurality of signal transfer devices to change the frame interval threshold to a corresponding one of the new values for the preset frame interval thresholds.

* * * * *